United States Patent [19]

Hirai

[11] Patent Number: 4,951,895

[45] Date of Patent: Aug. 28, 1990

[54] TIRE CONSTITUTING MEMBER WINDING TENSION CONTROLLING APPARATUS

[75] Inventor: Takayuki Hirai, Kodaira, Japan

[73] Assignee: Bridgestone Corporation, Tokyo, Japan

[21] Appl. No.: 349,616

[22] Filed: May 10, 1989

[30] Foreign Application Priority Data

May 10, 1988 [JP] Japan .................................. 63-113354

[51] Int. Cl.$^5$ ..................... B65H 59/18; B65H 77/00; B29D 30/20
[52] U.S. Cl. ............................... 242/75.51; 242/75.2; 226/38; 226/39; 156/406.4
[58] Field of Search ................... 242/75.5, 75.51, 75.2; 226/38, 39, 195; 156/130, 397, 406.4, 406.5

[56] References Cited

U.S. PATENT DOCUMENTS

| | | | |
|---|---|---|---|
| 3,977,621 | 8/1976 | Huffman | 242/75.51 X |
| 4,005,828 | 2/1977 | Peszeszer | 242/7.23 X |
| 4,099,682 | 7/1978 | Benuska | 242/56 R |
| 4,155,789 | 5/1979 | Wireman et al. | 242/75.51 X |
| 4,206,009 | 6/1980 | Kazares | 156/130 |
| 4,551,806 | 11/1985 | Storace et al. | 156/397 X |
| 4,609,336 | 9/1986 | Stevenson et al. | 242/75.51 X |

Primary Examiner—Stuart S. Levy
Assistant Examiner—Steven M. duBois
Attorney, Agent, or Firm—Sughrue, Mion, Zinn, Macpeak & Seas

[57] ABSTRACT

A winding tension controlling apparatus controls tensile force to be applied to a tire constituting member spirally wound about a building drum. The apparatus comprises a memory device for storing patterns of tensile forces, a detecting sensor for always detecting winding positions of the tire member and a processing unit for obtaining a tensile force value from a pattern of tensile force received on the basis of the memory device and a detected result from the memory device and outputting the tensile force value as a control signal. The apparatus further comprises a regenerative control device for controlling a DC motor connected to a tension roller to cause the tension roller to rotate at a speed slower by a predetermined value than a running speed of the tire member wound about the building drum and a display device for displaying various informations concerning winding of the tire member. In this manner, the tire member causes the tension roller to accelerate until its circumferential speed becomes substantially equal to the running speed of the tire member wound about the building drum, thereby causing a tensile force in the tire member equal to the tensile force value to applied to the tire member.

4 Claims, 3 Drawing Sheets

FIG_2
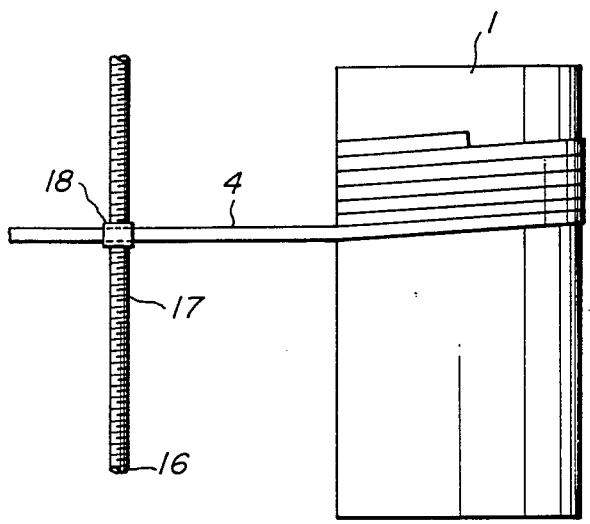
FIG_3
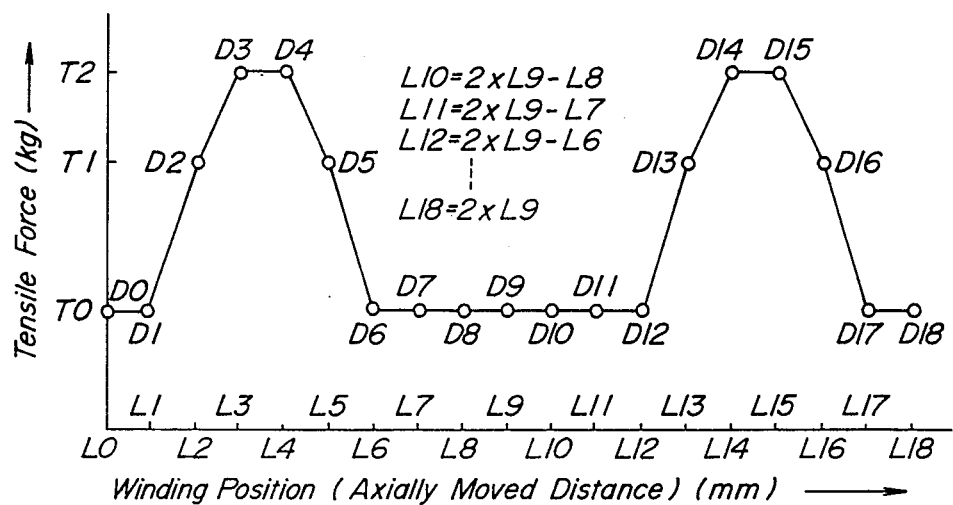

FIG_4a
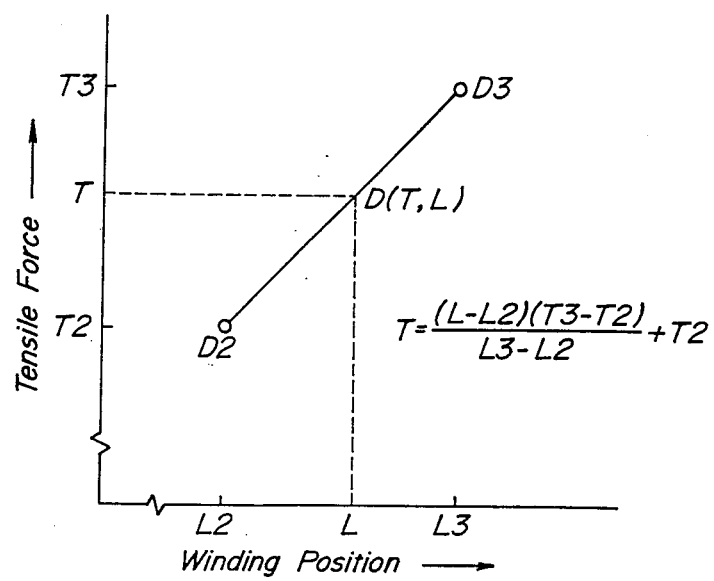
FIG_4b
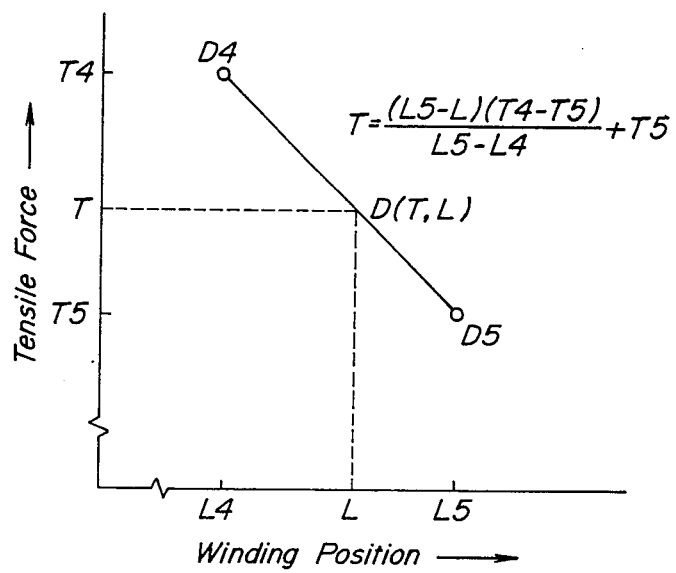

TIRE CONSTITUTING MEMBER WINDING TENSION CONTROLLING APPARATUS

BACKGROUND OF THE INVENTION

This invention relates to a tire constituting member winding tension controlling apparatus for controlling tensile forces exerted on a tire constituting member depending on winding positions of the member onto a building drum when the member being transferred in contact with a tension pulley for winding the member about the building drum.

Recently, a pneumatic tire suitable for running at high speeds has been proposed. The tire is constructed so that a belt-like tire constituting member is spirally wound radially outwardly about a belt layer and tensile forces in a zone of the tire constituting member adjacent shoulders of the tire are larger than those in a zone adjacent an equatorial plane of the tire. Both the shoulders are thus strongly restrained to prevent radial enlargement of the shoulders due to a large mass of rubber. Such a tire constituting member capable of changing tensile forces therein as above described can be obtained, for example, by changing winding tensile forces depending on winding positions when the tire constituting member is being wound about a building drum.

An apparatus capable of controlling tensile forces depending on winding positions in such a manner has been proposed in Japanese Patent Application No. 62-98,388 (filed on Apr. 21, 1987 by the assignee of the present case). The proposed apparatus comprises a brake roller provided upstream of a building drum and in contact with a running tire constituting member, an electromagnetic brake connected with the brake roller and a program setting device having a program memorized therein for controlling the electromagnetic brake. Moreover, the apparatus further comprises a controller for feeding control signals to the electromagnetic brake through a regulator according to a program called from the program setting device when the tire constituting member arrives at a winding starting position so as to control braking force produced in the electromagnetic brake to give a tensile force depending on a winding position to the tire constituting member. The apparatus further comprises a tension detection sensor for detecting the tensile force given to the tire constituting member and providing a signal corresponding to the detected tensile force as a feed-back signal to the regulator.

However, such a tensile force controlling apparatus includes the electromagnetic brake and, durability against friction is low and the braking force can be variable only in a narrow range. Moreover, because feedback control is utilized, feed back delay will occur when the tire constituting member is longer. Therefore, the apparatus has some room for improving accuracy in control of winding tensile forces with respect to a predetermined tensile force pattern, accuracy in response and reliability. Moreover, as the controlled state of the apparatus when winding the member cannot be always confirmed so that problems are only noticed after the elapse of long time.

SUMMARY OF THE INVENTION

It is an object of the invention to provide an improved tire constituting member winding tension controlling apparatus which eliminates all the disadvantages of the prior art and are high in accuracy in control of winding tensile forces, high in accuracy in response and high in reliability, and which is durable against friction and has a wide range of variable braking force and further enables any problems occurring therein to be rapidly found.

In order to achieve the object of the invention, in a winding tension controlling apparatus for tire constituting members for controlling tensile force to be applied to a tire constituting member depending on a winding position of the tire constituting member which is spirally wound about a building drum during running of the member in contact with a tension roller, the apparatus according to the invention comprises storing means for storing patterns of tensile forces previously inputted for applying the tensile forces to the tire constituting members, a detecting sensor for always detecting winding positions of the tire constituting member being wound onto the building drum, processing means for obtaining a tensile force value to be applied to the tire constituting member at the instant on the basis of a pattern of tensile force received from the storing means and a detected result received from the detecting sensor and outputting the tensile force value as a control signal, regenerative control means for controlling a DC motor connected to the tension roller to cause the tension roller to rotate at a speed slower by a predetermined value than a running speed of the tire constituting member wound about the building drum, and display means for displaying various informations concerning winding of the tire constituting member, whereby said tire constituting member causes said tension roller to accelerate until its circumferential speed becomes substantially equal to the running speed of the tire constituting member wound about the building drum so that current generated in the DC motor is regenerated on a side of a power source by means of said regenerative control means to give the DC motor braking force, thereby causing a tensile force in the tire constituting member substantially equal to said tensile force value to be applied to the tire constituting member.

It is assumed that after the tire constituting member was brought into contact with the tension roller and fed to the building drum, the tire constituting member has been spirally wound about the building drum. At this moment, a detected result of the winding position of the tire constituting member onto the drum is fed from the detecting means to the processing means. Moreover, one of the patterns of tensile forces previously inputted in the storing means is fed from the storing means into the processing means. The processing means obtains a tensile force value to be applied to the tire constituting member at the instant with the aid of the detected result and the pattern of tensile force and thereafter the processing means sends the tensile force value as a control signal to the regenerative control means. As a result, the regenerative control means controls the rotation of the DC motor so that the tension roller connected to the DC motor is caused to rotate at a circumferential speed slower by a predetermined value than the running speed of the tire constituting member wound on the building drum.

In this case, since the tension roller and the tire constituting member do not slide with each other, the tension roller is forced to accelerate by the tire constituting member until the circumferential speed of the tension roller becomes equal to the running speed of the tire constituting member. Such acceleration causes a tensile force in the tire constituting member substantially equal to the tensile force value above described. In other words, the increase in speed of the tension roller causes the DC motor to generate current which is then regenerated onto the side of the power source so that braking force is applied onto the DC motor.

In this manner, by regeneratively controlling the DC motor and in doing so by obtaining the tensile force value at the instant, the tensile force is given to the tire constituting member. In this case, as the generated current is regenerated onto the power source, it is possible to improve accuracy in control of winding tensile forces, accuracy in response to actuation, reliability in use and durability against wear. Moreover, the apparatus has a wide range of variable braking forces. Furthermore, as the display means always indicates the winding state every moment, any problems can be found early by an operator.

The invention will be more fully understood by referring to the following detailed specification and claims taken in connection with the appended drawings.

BRIEF DESCRIPTION OF THE DRAWINGS

FIG. 2 is a view illustrating the building drum and the screw shaft viewed in directions shown by arrows II;

FIG. 3 is a graph illustrating one example of tension patterns used in the invention; and FIGS. 4a and 4b are graphs for explaining the arithmetic operation for obtaining tensile forces to be applied to the tire constituting member.

DETAILED DESCRIPTION OF THE PREFERRED EMBODIMENTS

Figure 1:
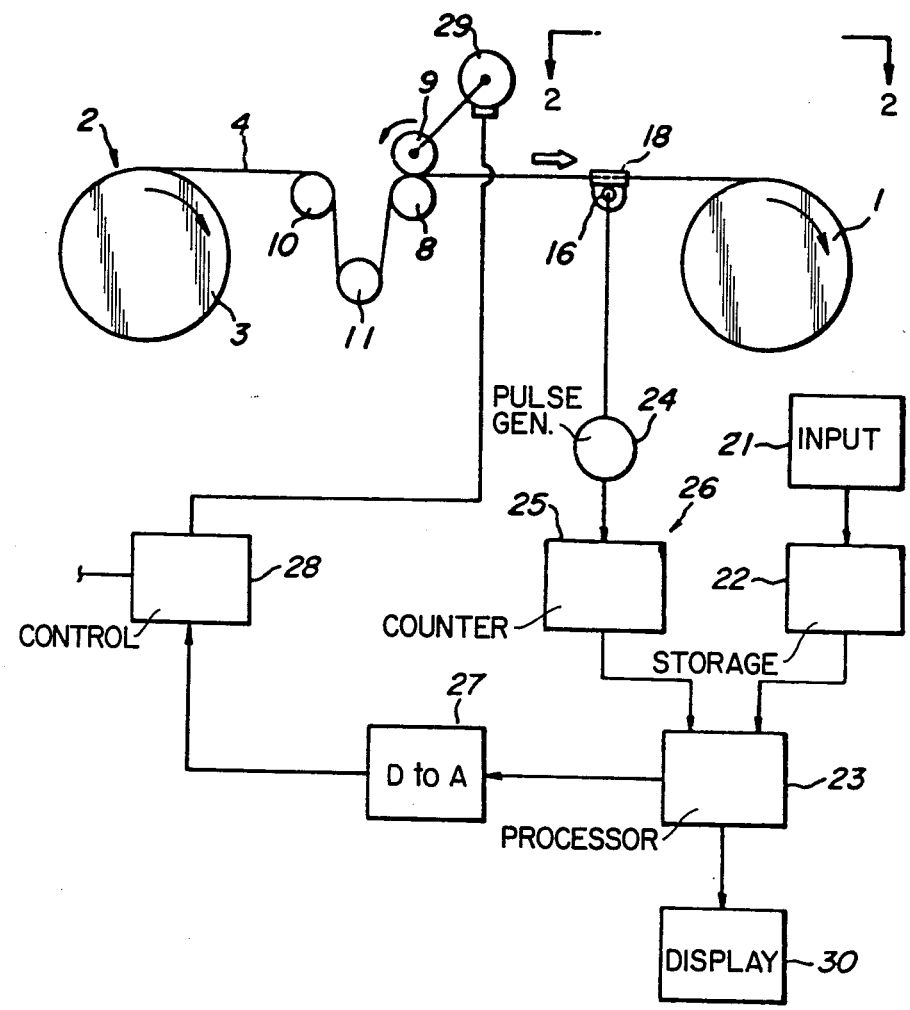
FIG. 1 is a front view partially including a block diagram illustrating one embodiment of the invention.

Referring to FIGS. 1 and 2, a building drum 1 for forming a tire is cylindrical and rotatively driven by a motor (not shown). On a rear side of the building drum 1 is arranged a pay-off unit 2 having a roll 3 from which a narrow tire constituting member 4 is paid out so as to be supplied to the buildings drum 1. Between the building drum 1 and the pay-off unit 2 there are provided a rotatable support roller 8 and a tension roller 9 above the support roller 8, between which the tire constituting member 4 passes. As a result, the tire constituting member 4 is always in contact with the tension roller 9 without sliding therebetween.

Moreover, the tire constituting member 4 runs about and in contact with guide rollers 10 and 11. The guide roller 11 acts as a dancer roller and takes up slack in the member 4 by gravity. A loop of the member 4 extending about the guide roller 11 serves as a surplus in length of the member 4 providing for any problems in running of the member 4. Between the tensile roller 9 and the building drum 1 is provided a screw shaft 16 which is in parallel with an axis of the building drum 1 and formed on its outer surface with screw threads 17 (FIG. 2). A winding guide 18 is threadedly engaged with the threads of the screw shaft 16 for guiding the tire constituting member 4 in a manner that the tire constituting member 4 is spirally wound about the building drum 1 when the winding guide 18 moves along the screw shaft 16.

Inputting means 21 is provided for inputting process numbers and contents of the processes (patterns of tensile forces to be applied to the tire constituting member 4). The "process numbers" herein are numbers given to tires to be formed. One number is given to one kind of tires. On the other hand, the "patterns of tensile forces or tension patterns" are predetermined according to the process numbers. The tension pattern does mean polygonal lines in a graph for example in FIG. 3 whose abscissa indicates winding positions (moved distances of the winding guide in an axial directions of the screw shaft 16) and ordinate indicates tensile forces. Signals inputted from the inputting means 21 as tension patterns are coordinates of respective inflection points in a graph (angular points of polygonal lines, for example, points D1, D2 ... D18).

In the case that a tension pattern is linesymmetrical with respect to a center of winding positions as shown in FIG. 3, the inputting above described is performed from a winding starting position to the winding center position, for example, D0 to D9 and inputting thereafter is omitted. In this case, x coordinates of inflection points of the later half, or points D10 to D18 are automatically set by the inputting means using equations shown in FIG. 3.

Referring again to FIG. 1, storing means 22 is provided for storing the process numbers and the tension patterns inputted from the inputting means 21. In forming tires of a predetermined kind, when one process number corresponding to the tire now being formed is called, a tension pattern associate with the process number or coordinates of inflection points in the storing means are called which are fed to processing means 23.

On the other hand, the screw shaft 16 is provided with a pulse generator 24 secured thereto, which generates pulses corresponding to rotation of the screw shaft 16. The pulses from the pulse generator 24 are fed to a counter 25 which counts the pulses to detect an axial position of the winding guide 18 or a winding position of the tire constituting member 4 at the moment. The pulse generator 24 and the counter 25 form a detecting sensor 26 as a whole for always detecting winding positions of the tire constituting member 4 onto the building drum 1.

The detected results by the detecting sensor 26 are fed to the processing means 23 in the same manner as the coordinates of the inflection points from the storing means 22. The processing means determines a position between inflection points at which the tire constituting member 4 is being wound with the aid of the coordinates of inflection points and the detected results. At the same time, the processing means 23 momentarily performs an arithmetic operation to obtain a tensile force value to be applied to the tire constituting member 4 at the moment (at the present winding position). As shown in FIGS. 4a and 4b, arithmetic equations are different in the cases that the tensile force is increasing as shown between the inflection points D2 and D3 and that the tensile force is decreasing as shown between the inflection points D4 and D5, respectively.

The tensile force value to be applied to the tire constituting member 4 detected in the processing means 23 is converted into a tension signal (torque signal) by means of an DA converter 27 as shown in FIG. 1 and fed to regenerative control means 28. As a result, a DC motor 29 regenerate a regenerative current onto a side of a power source with the aid of the regenerative control means 28 to produce braking force. The DC motor 29 is connected to the tension roller 9. Therefore, when the DC motor 29 is rotated at a speed corresponding to the tension signal, the tension roller 9 is also rotatively driven at a circumferential speed slower by a predetermined value than a speed of the tire constituting member 4 wound on the building drum 1.

On the other hand, the tire constituting member 4 and the tension roller 9 do not slide relative to each other as above described. Therefore, the tire constituting member 4 causes the tension roller 9 to accelerate until its circumferential speed becomes equal to the running speed of the tire constituting member 4. As a result, the DC motor 29 is also forced to accelerate so that the DC motor 29 generates a current commensurate with its acceleration. On the other hand, a tensile force is produced in the tire constituting member 4 owing to a resistance caused in the DC motor 29 when it is accelerated as above described. The tensile force produced in the tire constituting member 4 is substantially equal to the tensile force value detected in the processing means 23. In other words, the direct current generated in the DC motor 29 is regenerated to the side of the power source through the renegerative control means 28 to produce the braking force in this manner.

Display means 30 having, for example, a plurality of LED (light-emitting diode) elements is provided for displaying inputted informations, for example, process numbers and coordinates of inflection points during inputting these informations or by reading from the storing means 22. Moreover, the display means 30 displays a wound state of the tire constituting member 4, for example, a winding position and a tensile force acting upon the tire constituting member 4 at the instant by reading the regenerative current.

The operation of the apparatus of the embodiment according to the invention as above described will be explained.

It is now assumed that after a tire constituting member 4 paid out of the roll 3 by means of the pay-off unit 2 was supplied onto the rotating building drum 1 while being in contact with the tension roller 9, the tire constituting member 4 has been wound about the building drum 1. In this case, the winding guide 18 for guiding the tire constituting member 4 is moved in the axial direction of the building drum 1 by the rotating screw shaft 16 so that the tire constituting member 4 is spirally wound about the building drum 1. During such an operation, pulses corresponding to rotation of the screw shaft 16 are fed from the pulse generator 24 to the counter 25 so that the counter 25 counts the pulses to detect an axial position of the winding guide 18 or a winding position of the constituting member 4 at the moment.

The detected results are fed from the counter 25 to the processing means 23. On the other hand, the processing means 23 receives information as tension pattern signals, for example, coordinates of inflection points of a process number corresponding to a tire now being formed among informations such as process numbers and coordinates of inflection points of respective processes previously stored in the storing means 22. The processing means 23 having received such detected signals and tension pattern signals determines inflection points between which the winding is effected at the instant and performs arithmetic operation by substituting the winding position at the instant in an equation shown in FIG. 4a or 4b to obtain a tensile force value to be applied to the tire constituting member 4.

The tensile force value obtained in the processing means 23 is converted in the DA converter 27 and fed into the regenerative control means 28. As a result, the tension signal is fed from the regenerative control means 28 to the DC motor 29 to control its rotating speed such that the tension roller 9 is rotatively driven at a speed slower by a predetermined speed than a speed of the tire constituting member 4 wound about the building drum 1.

In this case, because there is no slip between the tire constituting member 4 and the tension roller 9, the tire constituting member 4 forces the tension roller 9 to accelerate until its circumferential speed becomes equal to the running speed of the tire constituting member 4. As a result, the DC motor 29 is also forced to accelerate so that the DC motor 29 generates electric current commensurate with the increased speed. On the other hand, a tensile force substantially equal to the tension force value acts in the tire constituting member 4 due to a resistance caused when the DC motor 29 is accelerated.

In other words, the current generated in the DC motor 29 is regenerated onto the side of the power source to give the DC motor 29 a braking force. By detecting the tensile force value to be applied to the tire constituting member 4 at the instant and at the same time regeneratively controlling the DC motor 29, the tensile force is given to the tire constituting member 4. By regenerating the regenerative current generated in the process onto the side of the power source by means of the regenerative control means 28, accuracy or the like of the tensile force controlled in response to the tension pattern can be improved. Moreover, the display means 30 always indicates the winding state of the tire constituting member at every moment, for example, the winding position of the member and the tensile force value to be applied to the tire constituting member 4. Therefore, any problem can be found early.

As can be seen from the above description, the invention provides a tire constituting member winding tension controlling apparatus which is improved in accuracy in control of winding tensile forces, accuracy in response to actuation, reliability in use and durability against wear. Moreover, the apparatus according to the invention has a wide range of variable braking forces and can early find any troubles if occur.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A winding tension controlling apparatus for members constituting a portion of a tire for controlling tensile force to be applied to said member depending on a winding position of the member which is spirally wound about a building drum during running of the member in contact with a tension roller, comprising: storing means for storing patterns of tensile forces previously inputted for applying tensile forces to the member, a detecting sensor for detecting winding positions of the tire member relative to said building drum as said member is wound onto the building drum and generating an output, processing means for obtaining a tensile force value to be applied to said member in real time on the basis of a pattern of tensile forces received from the storing means and said output received from the detecting sensor and outputting the tensile force value as a control signal, regenerative control means for controlling, based on said control signal, a DC motor driving the tension roller to cause the tension roller to rotate at a speed slower than a predetermined value of a running speed of the member wound about the building drum, and means for displaying process information concerning winding of the member, whereby said member causes said tension roller to accelerate until its circumferential speed becomes substantially equal to the running speed of the member wound about the building drum so that a current generated in the DC motor is regenerated by means of said regenerative control means to provide the DC motor with a braking force, thereby causing a tensile force in the member to be substantially equal to said tensile force value to be applied to the member.

2. A winding tension controlling apparatus as set forth in claim 1, wherein said storing means comprises inputting means for inputting said patterns of tensile forces into the storing means.

3. A winding tension controlling apparatus as set forth in claim 1, wherein said detecting sensor comprises a pulse generator connected to a screw shaft for generating pulses corresponding to rotation of said screw shaft with which is threadedly engaged with a winding guide for guiding the member, and a counter for counting the pulses from the pulse generator and detecting axial positions of said winding guide as the winding position of the member.

4. A winding tension controlling apparatuses set forth in claim 1, wherein said processing means comprises digital to analog converter for converting tensile force values into torque signals.

* * * * *